US012540727B1

(12) United States Patent
Sharrah et al.

(10) Patent No.: US 12,540,727 B1
(45) **Date of Patent: *Feb. 3, 2026**

(54) FLASHLIGHT ASSEMBLY

(71) Applicant: Streamlight, Inc., Eagleville, PA (US)

(72) Inventors: Jonathan R. Sharrah, Phoenixville, PA (US); Raymond L. Sharrah, Collegeville, PA (US)

(73) Assignee: Streamlight, Inc., Eagleville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/239,560

(22) Filed: Jun. 16, 2025

Related U.S. Application Data

(63) Continuation of application No. 18/781,376, filed on Jul. 23, 2024, now Pat. No. 12,366,350.

(51) Int. Cl.

| | |
|---|---|
| ***F21V 23/04*** | (2006.01) |
| ***F21L 4/08*** | (2006.01) |
| ***F21V 29/10*** | (2015.01) |
| ***F21V 31/00*** | (2006.01) |

(52) U.S. Cl.
CPC .......... *F21V 23/0421* (2013.01); *F21L 4/085* (2013.01); *F21V 29/10* (2015.01); *F21V 31/005* (2013.01)

(58) Field of Classification Search
CPC ............. F21V 23/0414; F21V 23/0421; F21V 23/0428
See application file for complete search history.

(56) References Cited

U.S. PATENT DOCUMENTS

| | | | | | |
|---|---|---|---|---|---|
| 8,833,960 | B2 | 9/2014 | Opolka | | |
| 2005/0195595 | A1 * | 9/2005 | Probst | F21L 4/005 | 362/205 |
| 2008/0237422 | A1 * | 10/2008 | Dalton | A42B 3/04 | 248/229.1 |
| 2010/0176741 | A1 * | 7/2010 | Sharrah | F21V 21/0885 | 362/382 |
| 2010/0219775 | A1 * | 9/2010 | Maglica | H05B 45/10 | 315/362 |

(Continued)

FOREIGN PATENT DOCUMENTS

| | | | |
|---|---|---|---|
| CN | 104425141 | A | 3/2015 |
| WO | 2021034515 | A1 | 2/2021 |

OTHER PUBLICATIONS

International Search Report with Written Opinion of PCT/US2025/038654, mailed Nov. 26, 2025 (18 pages).

*Primary Examiner* — Alexander K Garlen
(74) *Attorney, Agent, or Firm* — Quarles & Brady LLP; James J. Aquilina

(57) ABSTRACT

A lighting device that includes a body having a front end and a rear end opposing the front end, a light source, and a switch assembly that extends through the rear end of the body. The switch assembly includes a switch button, a sealing boot, and a wave spring. The wave spring is compressed between the switch button and the sealing boot such that the sealing boot covers an end opening of a subframe. The switch button has an actuator extending through the wave spring. The switch assembly is depressible such that the actuator engages the sealing boot and applies pressure to a switch member disposed within the subframe. When the switch member is actuated, a signal is sent to the light source.

20 Claims, 9 Drawing Sheets

(56) References Cited

U.S. PATENT DOCUMENTS

| | | | | |
|---|---|---|---|---|
| 2012/0236551 | A1* | 9/2012 | Sharrah | G01R 31/378<br>362/157 |
| 2015/0369468 | A1 | 12/2015 | Chao | |
| 2017/0051903 | A1* | 2/2017 | Maglica | F21V 23/0492 |
| 2022/0099284 | A1 | 3/2022 | Sharrah | |

* cited by examiner

FLASHLIGHT ASSEMBLY

CROSS REFERENCE TO RELATED APPLICATION

The present application is a continuation of U.S. patent application Ser. No. 18/781,376, filed on Jul. 23, 2024, which is incorporated herein by reference in its entirety.

FIELD OF THE DISCLOSURE

The present disclosure relates to the field of portable lighting devices, and more particularly, to a handheld flashlight assembly with a sealed electronics compartment and improved tailcap switch.

BACKGROUND

Flashlight assemblies having a sealed electronics compartment are known in the art. Such flashlight assemblies often have high-profile sealed electronics compartments that include adhesives or compression-type seals that span across a gap between housing members and/or fasteners. These seals can be bulky, expensive to produce, and/or unreliable.

Existing flashlight assemblies also include switches located on the tail side thereof, i.e., opposite the lens. Some existing tail switch designs do not provide adequate operational feedback to the user when the switch is depressed.

Accordingly, there is a need for improved portable lighting devices that overcome these and other drawbacks of the prior art devices.

SUMMARY OF THE INVENTIVE CONCEPTS

In one respect, the inventive concept is: a lighting device comprising a body having a front end and a rear end, the rear end opposing the front end; a light source having a first state of operation and a second state of operation, the light source extending through the front end of the body; an electronics subassembly including a power source and a switch member; a subframe having an internal volume, an end opening, and a sealing surface that surrounds an opening in the subframe, the power source and the switch member being located within the internal volume, wherein the light source, the power source, and the switch member are electrically coupled together; a seal having a perimeter, the perimeter being attached to the sealing surface such that the opening in the subframe is liquid impermeable; and a switch assembly that extends through the rear end of the body, the switch assembly comprising a switch button, a sealing boot, and a wave spring, the switch button having an actuator, the wave spring being compressed between the switch button and the sealing boot such that the sealing boot covers the end opening and renders it liquid impermeable, the actuator extending through the wave spring, the switch assembly being depressible such that the actuator engages the sealing boot and applies pressure to the switch member; wherein when the switch member is sufficiently depressed, the light source is changed between its first state of operation and its second state of operation.

In another respect the inventive concept is: a lighting device comprising a light source; a power source, the power source being electrically coupled to the light source; a subframe having an internal volume, an end opening, and a sealing surface that surrounds an opening in the subframe, the opening being sized to allow for insertion of the power source into the internal volume of the subframe through the opening, the power source being located entirely within the internal volume; a switch assembly that is engageable by a user from an exterior of the lighting device, the switch assembly comprising a switch button, a sealing boot, and a wave spring, the switch button having an actuator, the wave spring being compressed between the switch button and the sealing boot such that the sealing boot covers the end opening of the subframe and renders it liquid impermeable, the actuator extending through the wave spring; a seal having a perimeter, the perimeter being attached to the sealing surface such that the opening in the subframe is fluid-impermeable; and a body having a front end and a rear end, the rear end opposing the front end, the body enclosing the subframe and at least a portion of the light source, the light source extending through the front end of the body; wherein the subframe and the seal are comprised of a plastic material, and the perimeter of the seal is removably attachable and reattachable to the sealing surface of the subframe using an adhesive material.

BRIEF DESCRIPTION OF THE DRAWINGS

The lighting device according to the present disclosure is further described with reference to the accompanying drawings, in which.

DETAILED DESCRIPTION

Figure 1:
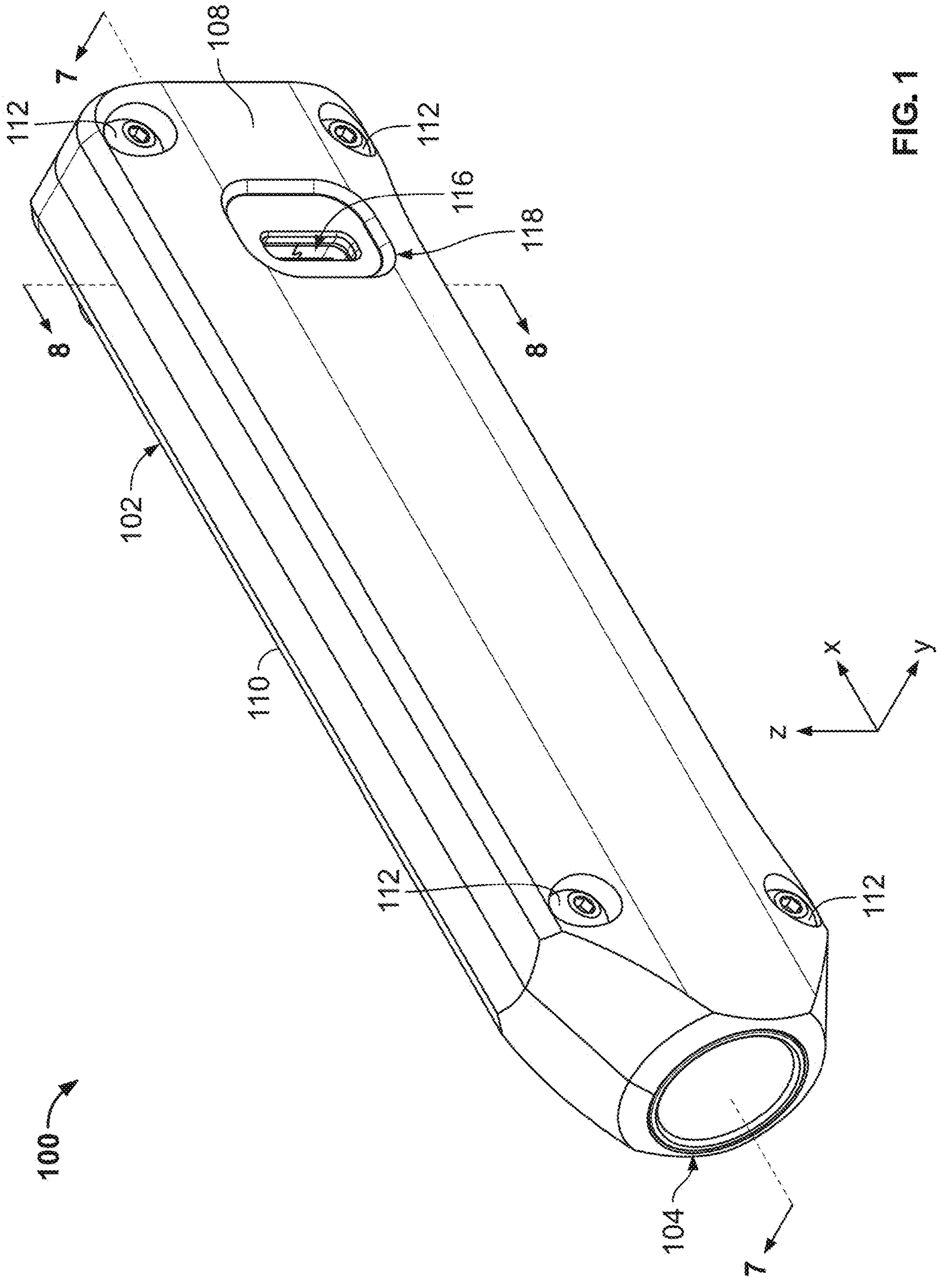
FIG. 1 is a front, right, isometric view of a flashlight assembly according to an embodiment of the present disclosure.

The ensuing detailed description provides exemplary embodiment(s) only, and is not intended to limit the scope, applicability, or configuration of the herein disclosed embodiment(s). Rather, the ensuing detailed description of the exemplary embodiment(s) will provide those skilled in the art with an enabling description for implementing the exemplary embodiments in accordance with the present disclosure. It should be understood that various changes may be made in the function and arrangement of elements without departing from the spirit and scope of the invention, as set forth in the appended claims.

To aid in describing the disclosure and/or invention as claimed, directional terms may be used in the specification and claims to describe portions of the present disclosure and/or invention (e.g., upper, lower, left, right, etc.). These directional definitions are merely intended to assist in describing the embodiment(s) and claiming the invention, and are not intended to limit the disclosure or claimed invention in any way. In addition, reference numerals that are introduced in the specification in association with a drawing figure may be repeated in one or more subsequent figures without additional description in the specification, in order to provide context for other features.

It should be understood that when an element is referred to as being "connected" or "coupled" to another element, it can be integral with the other element, directly connected or coupled to the other element, or that intervening elements may be present. In contrast, when an element is referred to as being "directly connected" or "directly coupled" to another element, it should be understood that no intervening elements are present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments, unless noted to the contrary.

FIGS. 1-8 illustrate a flashlight assembly 100 according to an embodiment of the present disclosure. In general, the flashlight assembly 100 can be configured as a portable lighting device. With reference to FIG. 1, the flashlight assembly 100 includes a body assembly 102 and a light assembly 104. The body assembly 102 includes a first body member 108 and a second body member 110. As shown, the first and second body members 108, 110 can be secured together via fasteners 112; however, other configurations are possible. For example, in some embodiments, members of the body assembly 102 may be secured together via one or more of a variety of fastening mechanisms, including mechanical fasteners (pins, screws, bolts, plugs, rivets, etc.), adhesives, or welds.

Still referring to FIG. 1, the flashlight assembly 100 includes a charging port 116. The charging port 116 is accessible via an opening 118 formed in the first body member 108 of the body assembly 102. The opening 118 is generally configured as a lateral side port. The charging port 116 is in electrical communication with a battery 120 (see, for example, FIGS. 4 and 5) and is configured to receive an external power source (e.g., a USB power source). The battery 120 can be configured as a rechargeable battery and serves as the power source for illuminating a light of the light assembly 104. Thus, the external power source can charge the battery 120 of the flashlight assembly 100. In some embodiments, the charging port 116 can also allow for data transmission to the flashlight assembly 100 (e.g., a firmware update) and/or provide the ability to charge another external device using the energy stored in the battery 120.

Figure 2:
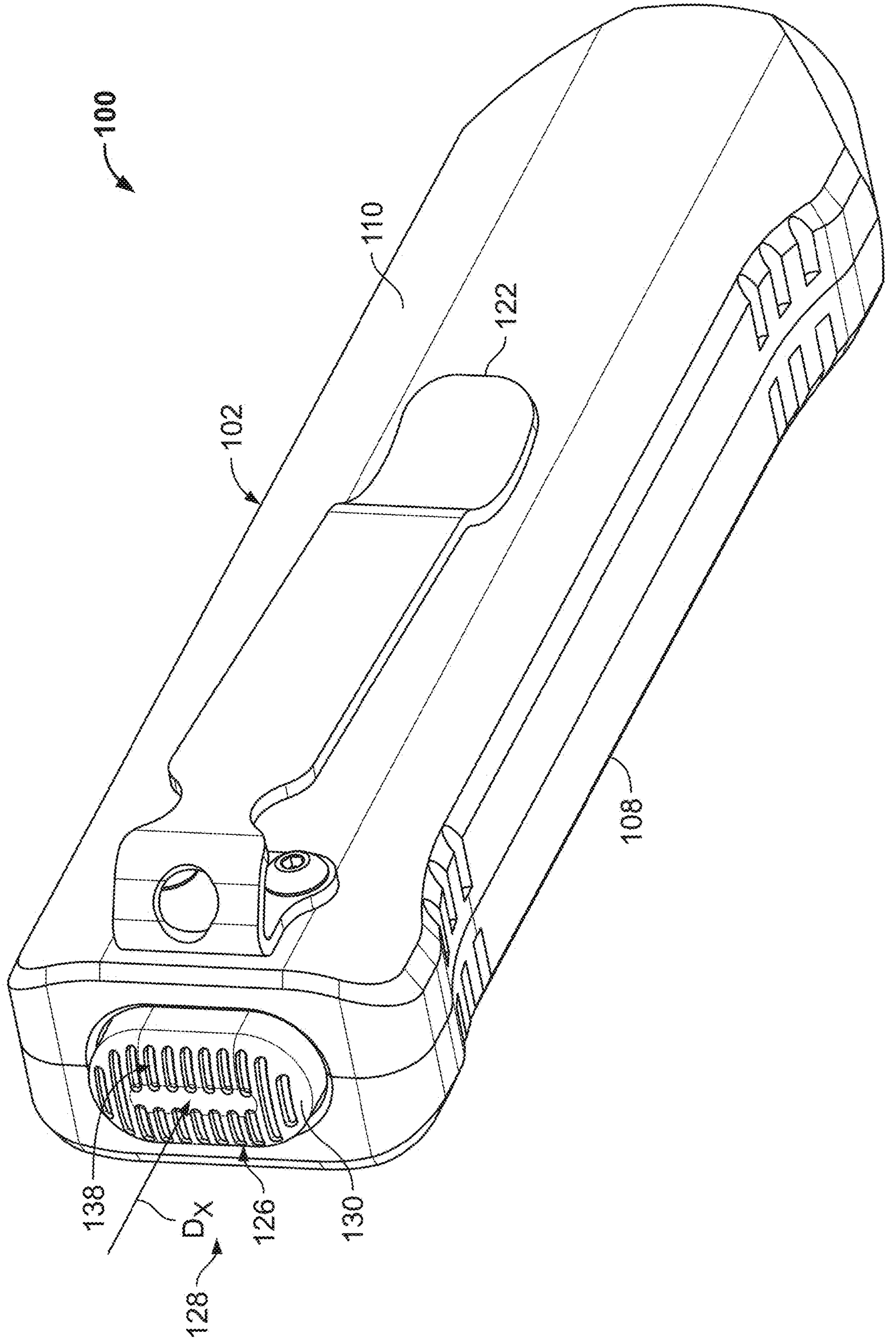
FIG. 2 is a rear, bottom, left isometric view of the flashlight assembly of FIG. 1.

FIG. 2 illustrates a rear view of the flashlight assembly 100. As shown in FIG. 2, the flashlight assembly 100 can further include a clip body 122 secured to the second body member 110 and a switch assembly 126 disposed at a rear end 128 of the body assembly 102 in a configuration commonly referred to in the art as a tail switch configuration. In this embodiment, the switch assembly 126 includes a switch button 130 that extends partially outside of the body assembly 102. In use, a user can push (or otherwise engage) the switch button 130 and push (or otherwise urge) the switch button 130 in the direction Dx shown in FIG. 2 to actuate the switch assembly 126 and turn on, off, or otherwise adjust a light source 134 (see FIG. 6) of the light assembly 104 (in this embodiment the light source 134 is a LED). The switch button 130 translates a pre-specified distance before reaching its designed limit of travel, stopping against the subframe 146. At its full length of travel, the internal center post (i.e., actuator 230) of the switch button 130 does not fully depress the switch member 198 (which in this embodiment is an electronic tactile switch). In fact in this embodiment, even at its full length of travel, actuator 230 does not fully reach the switch member 198, and actuation of the switch member 198 is achieved by compressing the seal 192 between the switch button 130 (i.e., the actuator 230) and the switch member 198. This design prevents the switch member 198 from being crushed if the light were to be dropped on its tail (i.e., on to switch button 130). This arrangement also prevents over-compression and collapse of spring 190. In some embodiments, the measurement of the gap between the end of the actuator 230 and the switch member 198 when the switch button 130 is at its full length of travel is some fraction of the measurement of the thickness of the seal 192, for example a fraction of between $1/8$ and $3/8$, more preferably a fraction of between $3/16$ and $5/16$, and most preferably a fraction of $1/4$ (for example a gap of 0.010 inches and a seal thickness of 0.040 inches).

As shown in FIG. 2, the switch button 130 can include an emboss 138. In the illustrated embodiment, the emboss 138 includes a plurality of lines (e.g., extending in the y-direction according to the x-y-z axes framework shown and established in FIG. 1). The emboss 138 can provide a tactile reference for a user who is locating the switch button 130. The switch button 130 can comprise one or more materials, including polymers or other composites. For example, the switch button 130 can include or consist of a polycarbonate.

Figure 3:
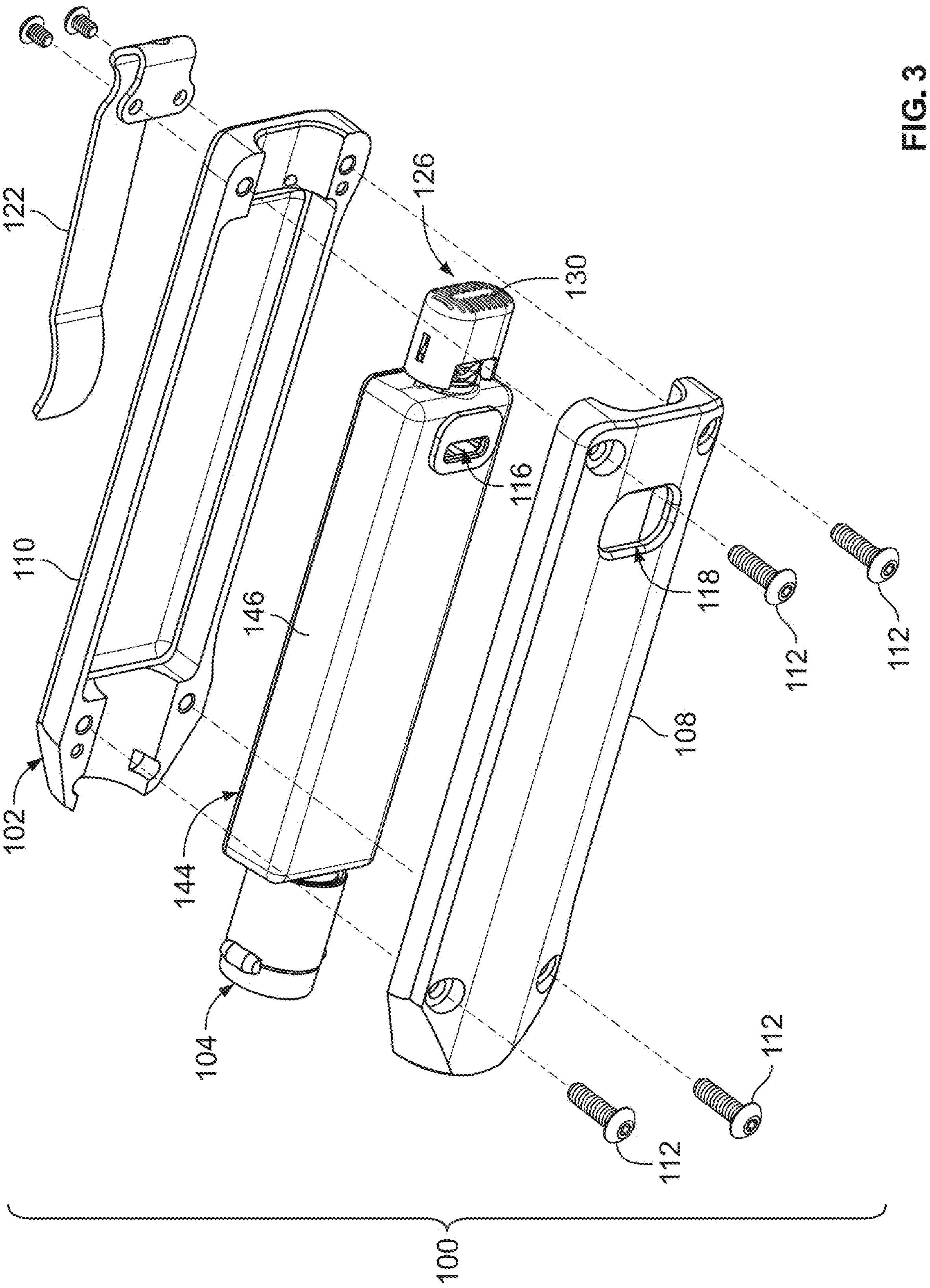
FIG. 3 is an exploded rear right isometric view of a body of the flashlight assembly of FIG. 1.

Referring now to FIG. 3, an exploded view of the body assembly 102 is shown. The body assembly 102 generally provides a housing for an electronics subassembly 144. The electronics subassembly 144 houses electronics for the flashlight assembly 100, including the battery 120, as will be described in more detail below. Each of the light assembly 104 and the switch assembly 126 are electrically coupled to the electronics subassembly 144. As shown, the switch assembly 126 is coupled to the rear end 128 of the electronics subassembly 144 and the light assembly 104 is arranged at an opposing end of the the electronics subassembly (e.g., a front end of the electronics subassembly 144).

Figure 4:
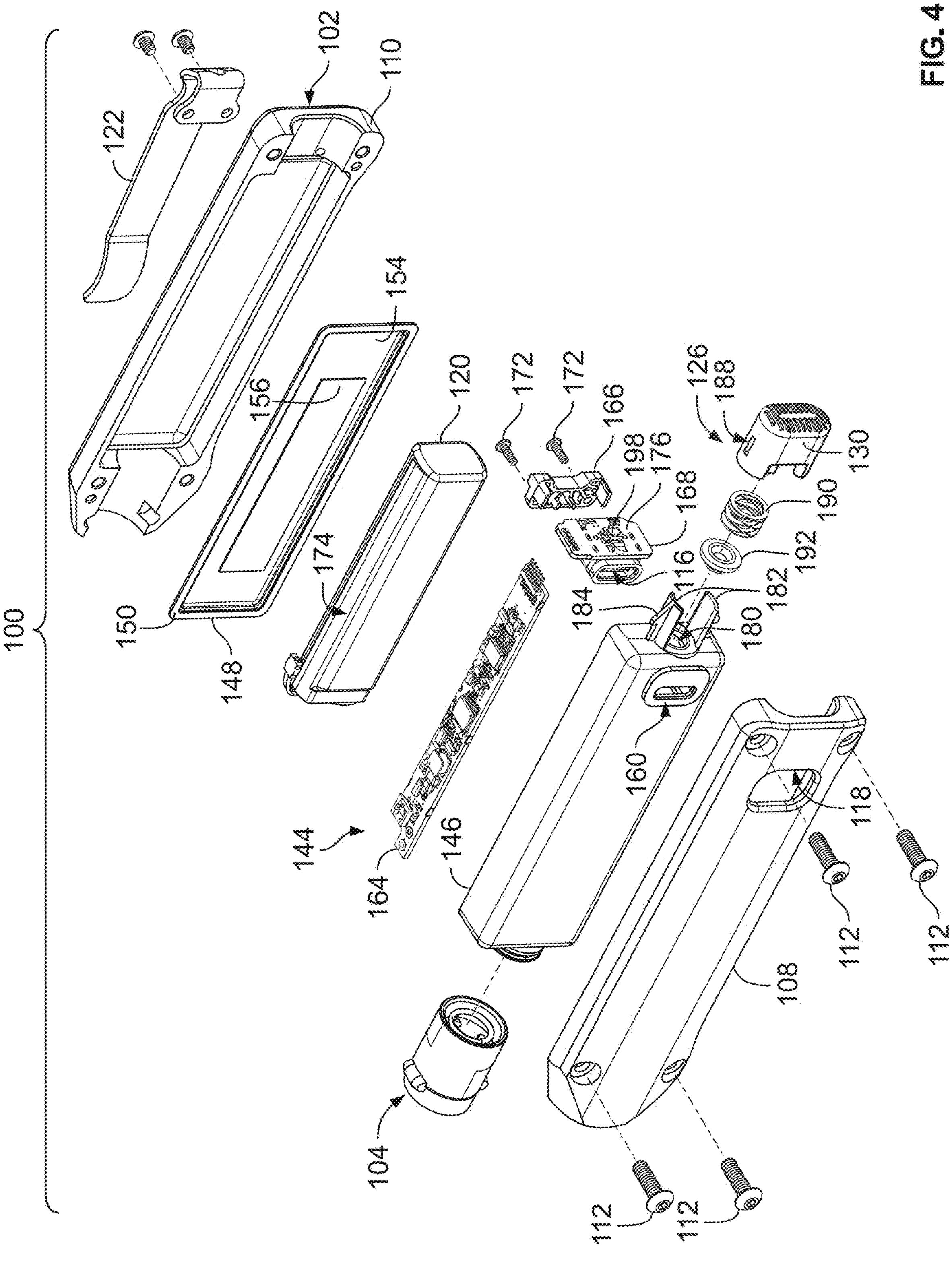
FIG. 4 is an exploded rear right isometric view of the flashlight assembly of FIG. 1.
Figure 5:
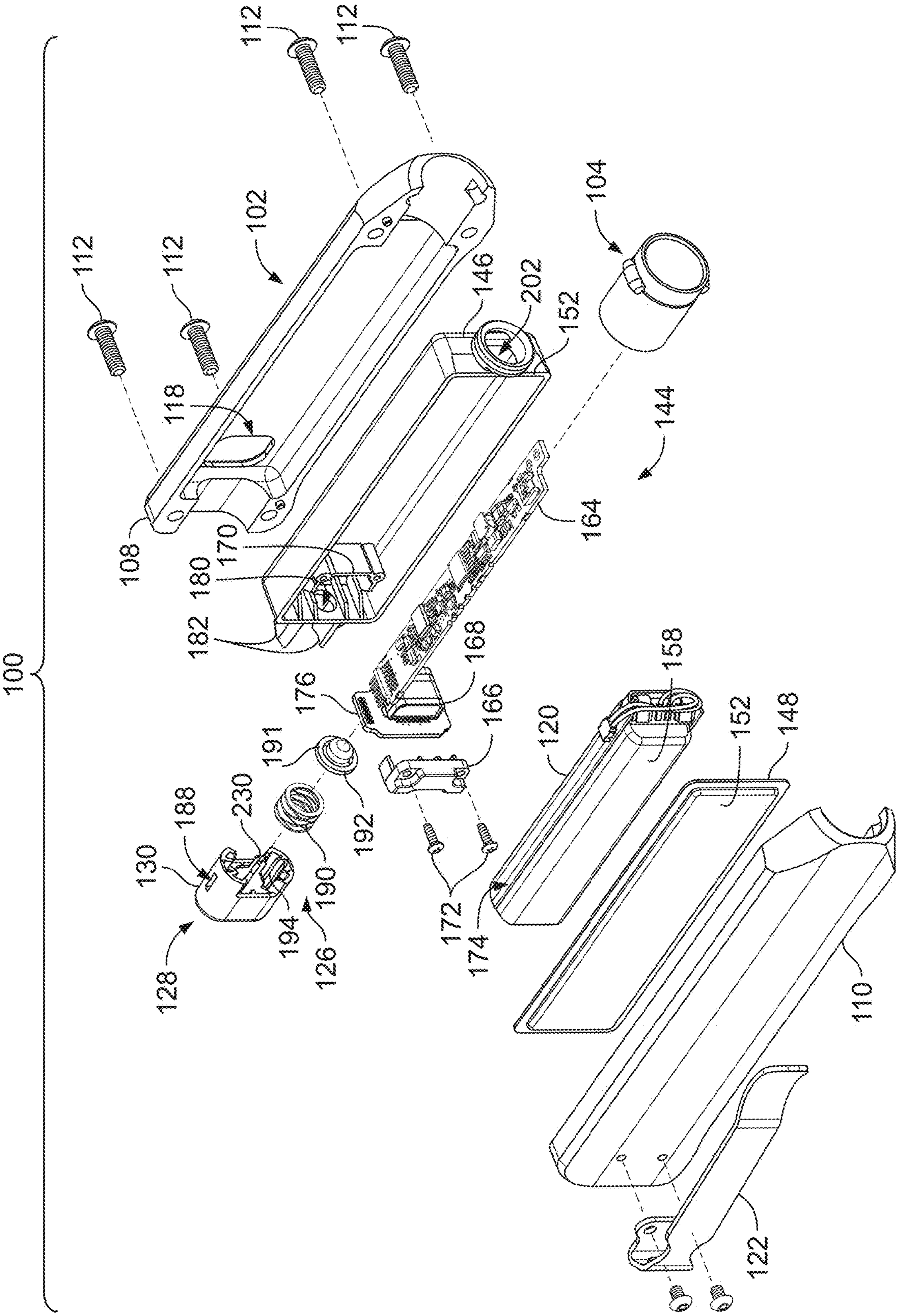
FIG. 5 is an exploded left isometric view of the flashlight assembly of FIG. 1.

As shown in FIGS. 4 and 5, the electronics subassembly 144 includes a subframe 146 and a seal 148. The seal 148 includes a mating surface 150 arranged about an outer perimeter of the seal 148. The mating surface 150 of the seal 148 is dimensioned to engage a sealing surface 152 of the subframe 146 (see FIG. 5). During an assembly process, the mating surface 150 of the seal 148 can be either heat-welded to or, alternatively, attached to the sealing surface 152 of the subframe 146 via an adhesive. The material seal between the perimeters of the subframe 146 and the seal 148 can provide a fluid-impermeable (e.g., waterproof) barrier between an exterior and an interior volume of the subframe 146 at the sealing surface 152.

In one embodiment, the seal 148 is configured as a plastic membrane, which could be for example made of a PET material. The use of a plastic membrane as the seal 148 that is heat-welded to the subframe 146 eliminates the use of adhesives or compression-type seals at the electronics subassembly 144, thereby simplifying construction and reducing costs. In the alternative, the plastic membrane that forms the seal 148 could be adhered to the perimeter of the subframe 146 via a removeable adhesive tape or other adhesive, for example an adhesive tape made by tesa tape inc. of Charlotte, North Carolina, U.S.A. The use of a removeable tape to form the bond between the seal 148 and the subframe 146 allows for easier repair or replacement of the components located interior to the subframe 146, e.g., the battery 120, e.g., by permitting the seal 148 to be removed and then reattached to the perimeter of the subframe 146. Furthermore, the use of a plastic membrane for the seal 148 also permits the seal 148 to have an extremely low profile, thus saving space within the body assembly 102. Still further, the seal 148 is flexible, which permits the battery 120 to swell and expand during its lifetime without destroying or reducing the effectiveness of the impermeable barrier formed by the seal 148.

As shown in FIG. 4, the seal 148 includes the mating surface 150 and a recessed body portion 154 (i.e., recessed from the perspective of FIG. 4). The seal 148 also includes a protruding planar member 156 that extends from the recessed body portion 154 toward the battery 120, as shown in FIG. 4. In general, the seal 148 includes a varying cross-sectional thickness across the mating surface 150, the recessed body portion 154, and the protruding planar member 156 thereof. These features of the seal 148 can allow for a close and secure fit with the battery 120. When the flashlight assembly 100, or at least the electronics subassembly 144, is assembled, the protruding planar member 156 can contact a side surface 158 of the battery 120 (see FIG. 5) to cushion and secure the battery 120 relative to the subframe 146.

As further shown in FIG. 4, the subframe 146 includes a subport 160. The subport 160 includes a seal plate and an opening that that extends from an external side of the subframe 146 to the internal volume of the subframe 146. The subport 160 is configured to align with the charging port 116 and the opening 118 of the body assembly 102 so that an external charger can extend through each of the opening 118 and the subport 160. The charging port 116 and the opening 118 of the body assembly 102 mate together to create a liquidproof seal such that no liquids or debris can enter the internal volume of the subframe 146.

With continued reference to FIGS. 4 and 5, the electronics subassembly 144 further includes a main printed circuit board (PCB) 164, a PCB retainer 166, and a USB assembly 168. Each of the PCB 164, the PCB retainer 166, and the USB assembly 168 can be housed within the subframe 146 and sealed within the subframe 146 by the seal 148. The USB assembly 168 includes the charging port 116 and is configured to align with the subport 160 and to electrically couple an external charger to the battery 120 to charge the battery 120. Additionally or alternatively, in other embodiments, an external device can be electrically coupled to the battery 120 via the USB assembly 168 to draw charge from the battery 120 and charge the external device.

The PCB retainer 166 is configured to secure the main PCB 164 relative to the battery 120. As shown in FIG. 5, the PCB retainer 166 can be secured to the subframe 146 at a subframe mount 170 via fasteners 172 (e.g., screws). However, other fastening configurations are possible, including pins, tabs, press-fit connections, adhesives, etc. In the illustrated embodiment, the subframe mount 170 is integrally (i.e., unitarily) formed with the subframe 146. When assembled, the main PCB 164 is configured to extend a along a narrow side 174 (e.g., a top side) of the battery 120. This orientation of the main PCB 164 can allow for a narrower, more compact PCB compared to conventional assemblies, and thereby allow for a more compact flashlight assembly 100.

As shown in FIG. 4, the USB assembly 168 also includes a printed circuit board 176 (e.g., a secondary circuit board) that is electrically coupled to the main PCB 164 and is configured to receive a signal from the switch assembly 126 to turn the light source 134 of the flashlight assembly 100 on or off or otherwise change its mode or intensity. Thus, the USB assembly 168 is in electrical communication with the main PCB 164 and the charging port 116. The printed circuit board 176 of the USB assembly 168 is configured to be retained within the subframe 146 and aligned with an end opening 180. The end opening 180 of the subframe 146 is an opening in the subframe 146 that extends between an external surface of the subframe 146 and the internal volume of the subframe 146. On the external surface of the subframe 146, the end opening 180 is at least partially framed by retainers 182.

The retainers 182 include a pair of tabs that extend in the direction of the x-axis from the rear end 128 of the subframe 146 (i.e., adjacent to the rear end 128 of the body assembly 102). In general, the retainers 182 are configured to retain the switch assembly 126 relative to the electronics subassembly 144. The retainers 182 include angled tabs 184 that generally come to point at a distal end of the retainers 182. The retainers 182 are arranged to engage the switch button 130 of the switch assembly 126 and the angled tabs 184 are each arranged to at least partially extend through a corresponding pair of slits 188 formed in the body of the switch button 130. During an assembly of the switch assembly 126 to the electronics subassembly 144, the switch button 130 can slide onto the retainers 182 until the angled tabs 184 slightly deform until they engage the slits 188 of the switch button 130, at which time they rebound and at least partially enter the slits 188. The angled geometry of the angled tabs 184 allows for the switch button 130 to be slid onto the retainers 182 during an assembly, but prevents the switch button 130 from being accidentally disconnected from the electronics subassembly 144 once secured.

Still referring to FIGS. 4 and 5, the switch assembly 126 can further include a wave spring 190 and a sealing boot 192. The sealing boot 192 is arranged to provide a seal at the end opening 180 of the subframe 146 to prevent liquids and debris from entering the interior volume of the subframe 146. The wave spring 190 extends between an internal body 194 of the switch button 130 and a flange 191 of the sealing boot 192. As will be further described below, the wave spring 190—in all of its possible compression states when the switch assembly 126 is assembled—provides sufficient pressure against the flange 191 of the sealing boot 192 to achieve consistent compression of the sealing boot 192 against the end opening 180 in the subframe 146, thus creating a liquidproof seal. The wave spring 190 also serves to increase the force required to depress the switch button 130 when compared to standard tail switches, thus improving feel for the user and increasing the necessary actuation travel distance, thus minimizing accidental activation of the light source 134. In this embodiment, the sealing boot 192 is configured as a flexible seal that can translate movement from the switch button 130. Thus, in use, when the switch button 130 is adequately pressed (i.e., in the direction Dx of FIG. 2), movement of the switch button 130 is translated to the sealing boot 192. The sealing boot 192 then interacts with a switch member 198 (which may be, for example, a snap-style switch) of the USB assembly 168 (see also FIG. 7) to control the light source 134 (or battery 120) of the flashlight assembly 100.

FIG. 5 also shows a front opening 202 of the subframe 146. The front opening 202 extends from an exterior surface of the subframe 146 to the interior volume of the subframe 146. The light assembly 104 can be secured to the electronics subassembly 144 at the front opening 202 of the subframe 146 so that the light assembly 104 is in electrical communication with the main PCB 164.

Figure 6:
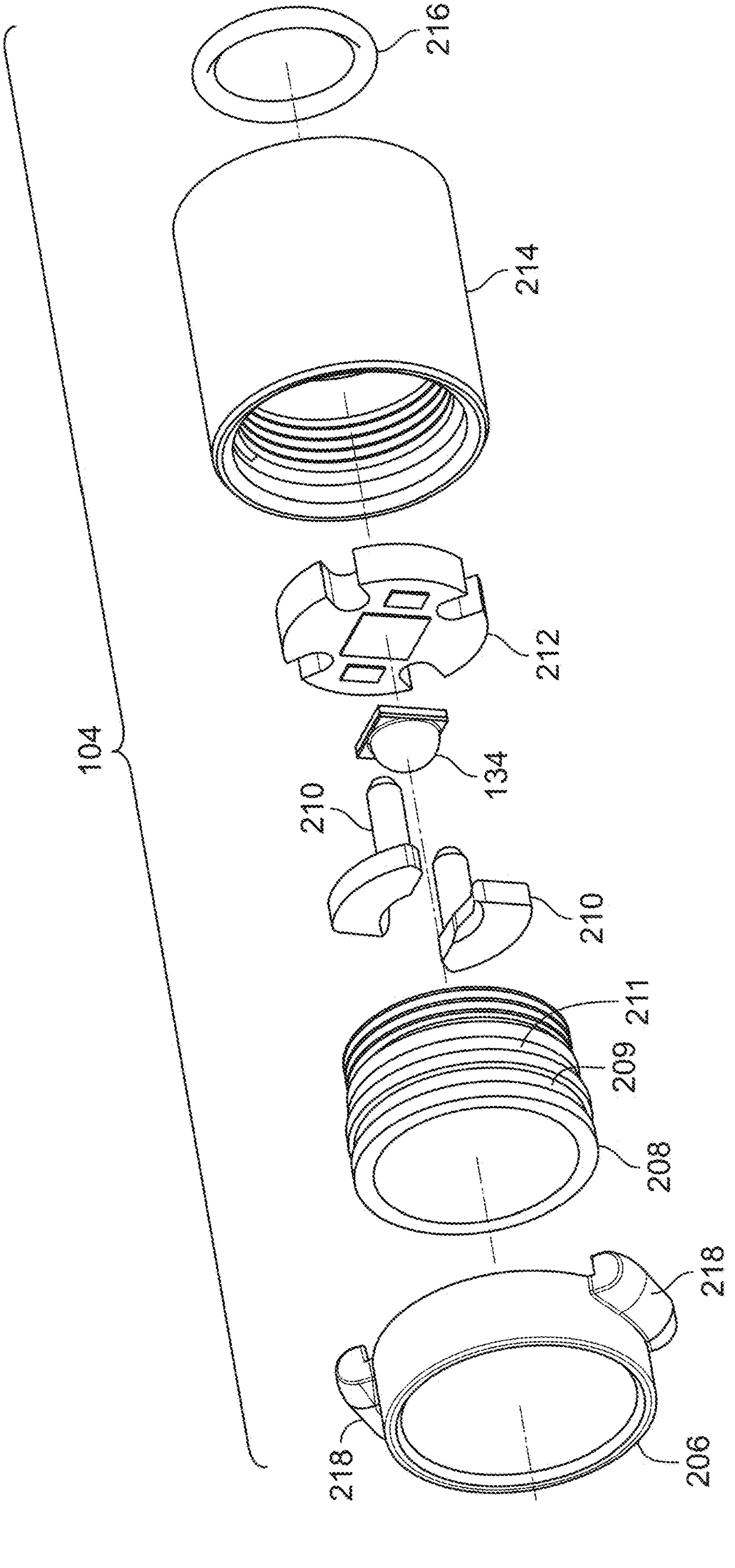
FIG. 6 is an exploded right isometric view of a light assembly of the flashlight assembly of FIG. 1.

Referring now to FIG. 6, the light assembly 104 includes a lens 206, a reflector 208, positioning pins 210, the light source 134, an LED PCB 212, a heatsink 214, and a seal 216. The lens 206 includes positioners 218 that extend radially from the lens 206. The positioners 218 are each arranged to engage a corresponding recess 222 in the body assembly 102 (see FIG. 7) and rotationally align the light assembly 104 with the body assembly 102. Similarly, the positioning pins 210 can extend through the LED PCB 212 to rotationally align the LED PCB 212 with the main PCB 164 within the electronics subassembly 144 to facilitate assembly. The subframe pins 210 include a flange and a stem. The flange is arranged to engage the LED PCB 212 and the stem is arranged to extend through the LED PCB 212. The subframe pins 210 function as centering devices and in this embodiment are comprised of plastic. When the reflector 208 is screwed into the heatsink 214, the subframe pins 210 act to: compress the LED PCB 212 against the heatsink 214 for good thermal conductivity; ensure concentricity of the light source 134 and reflector 208; limit the reflector 208 to the correct height of the focal point of the light source 134; and insulate the reflector 208 (which in this embodiment is metallic) from contacting the LED PCB 212.

Figure 7:
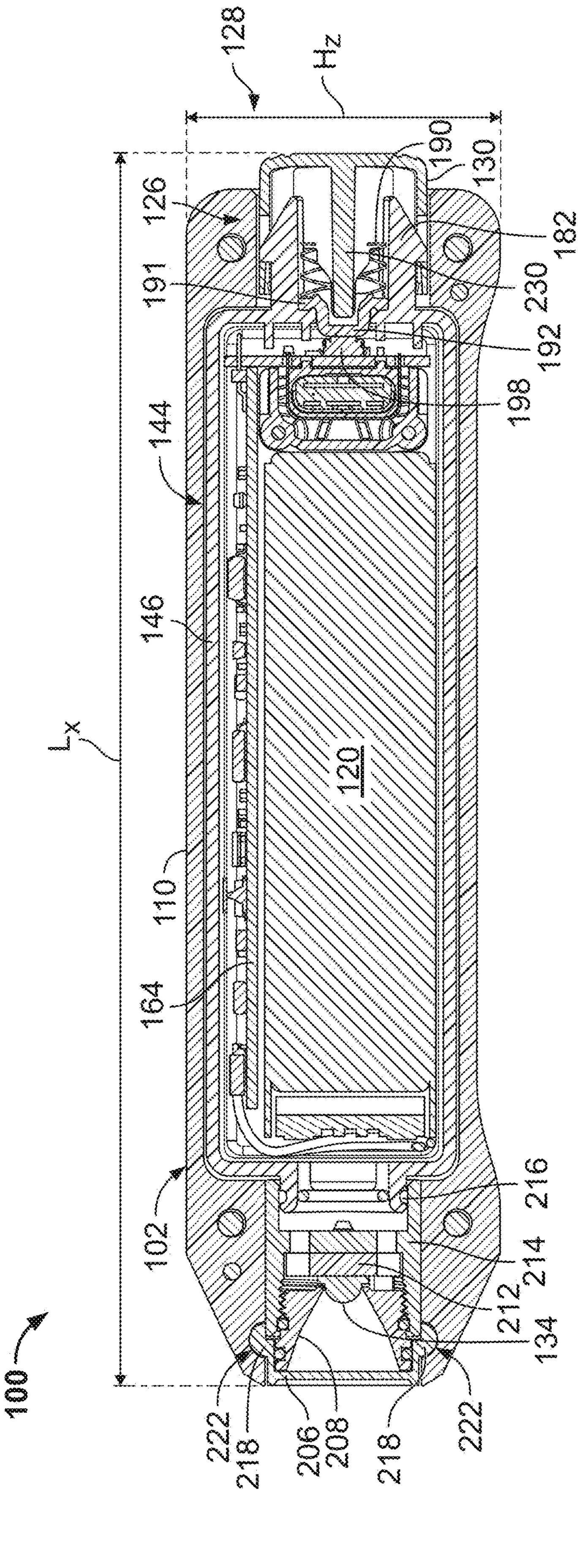
FIG. 7 is a cross-sectional right side view of the light assembly, taken along line 7-7 of FIG. 1.

As shown in FIG. 7, the heatsink 214 houses the light source 134 and the LED PCB 212. The seal 216 provides a seal between the heatsink 214 and the subframe 146 at the front opening 202. The reflector 208 can also include one or more seals (e.g., O-rings 209, 211) that help form a waterproof seal with the heatsink 214. Further shown in FIG. 7, as described above, the positioners 218 can be received within the recesses 222, which can help rotationally position the light assembly 114 relative to the main PCB 164 to facilitate assembly. The positioners 218 can also include a step in the axial direction. The heatsink 214 abuts the step to provide an axial stop between the lens 206 and the heatsink 214.

In general, the electronics subassembly 144 provides a complete seal (e.g., a waterproof seal) between the exterior of the subframe 146 and the interior volume of the subframe 146, which houses, e.g., the battery 120 and the main PCB 164. The total seal is provided by the subframe 146 in sealing contact with the seal 148 at the mating surface 150 of the seal and the sealing surface 152 of the subframe, the subframe 146 in sealing contact with the first body member 108 near the opening 118 via the sealing plate of the subport 160, the subframe 146 in sealing contact with the switch assembly 126 at the end opening 180 via the sealing boot 192, and the subframe 146 in sealing contact with the light assembly 104 at the front opening 202 with the seal 216 and the heatsink 214.

Further shown in FIG. 7, the switch assembly 126 is aligned in the x-axis direction with the printed circuit board 176 of the USB assembly 168 so that actuation of the switch button 130 in the x-axis direction actuates a switch member 198 of the printed circuit board 176 to control the flashlight assembly 100. As further shown in FIG. 7, the main PCB 164 extends along a narrow top side 174 of the battery 120. The main PCB 164 also extends generally perpendicular to the seal 148 (not shown in FIG. 8). That is, the largest planar surfaces of each of the main PCB 164 and the seal 148 are perpendicular. Thus, when assembled, the main PCB 164 does not engage the seal 148. The PCB 164 is rigidly attached to the body assembly 102 via the main PCB retainer 166. Therefore, advantageously, in use, if the battery 120 swells or the seal 148 flexes, the main PCB 164 remains unaffected, which can improve the durability and longevity of the flashlight assembly 100 compared to conventional flashlights. The USB assembly 168 (at a minimum the printed control board 176 thereof, and optionally also the charging port 116) may also be arranged perpendicular to each of the main PCB 164 and the seal 148.

Still referring to FIG. 7, as described above, the wave spring 190 extends between the internal body 194 of the switch button 130 and the sealing boot 192. The use of a wave spring instead of a convention round wire spring in this embodiment has the benefit of allowing for higher forces within a shorter compression distance (thus improving user feel, as noted above) in addition to the benefit of providing nearly seamless "shim" ends (i.e., the last turn of material of the wave spring 190 is flat on each end), which helps apply even compression force to the flange 191 of sealing boot 192. When the switch button 130 at the rear end 128 of the flashlight assembly 100 is actuated, the user can experience the same or similar compression of the switch button 130 as would be experienced with a conventional compression spring while the switch assembly 126 occupies a smaller axial distance than if a conventional compression spring were used.

With continued reference to FIG. 7, the flashlight assembly 100 defines a length $L_x$ in the x-direction and a height $H_z$ in the z-direction. In some embodiments, a ratio between the length $L_x$ and the height $H_z$ of the flashlight assembly 100 is approximately 3.82. That is, the ratio of $L_x$:$H_z$ is approximately 3.82:1. In other embodiments, the ratio between the length $L_x$ and the height $H_z$ of the flashlight assembly 100 is between 3.5 and 4.1. In other embodiments, the ratio between the length $L_x$ and the height $H_z$ of the flashlight assembly 100 is between 3.6 and 4.

Figure 8:
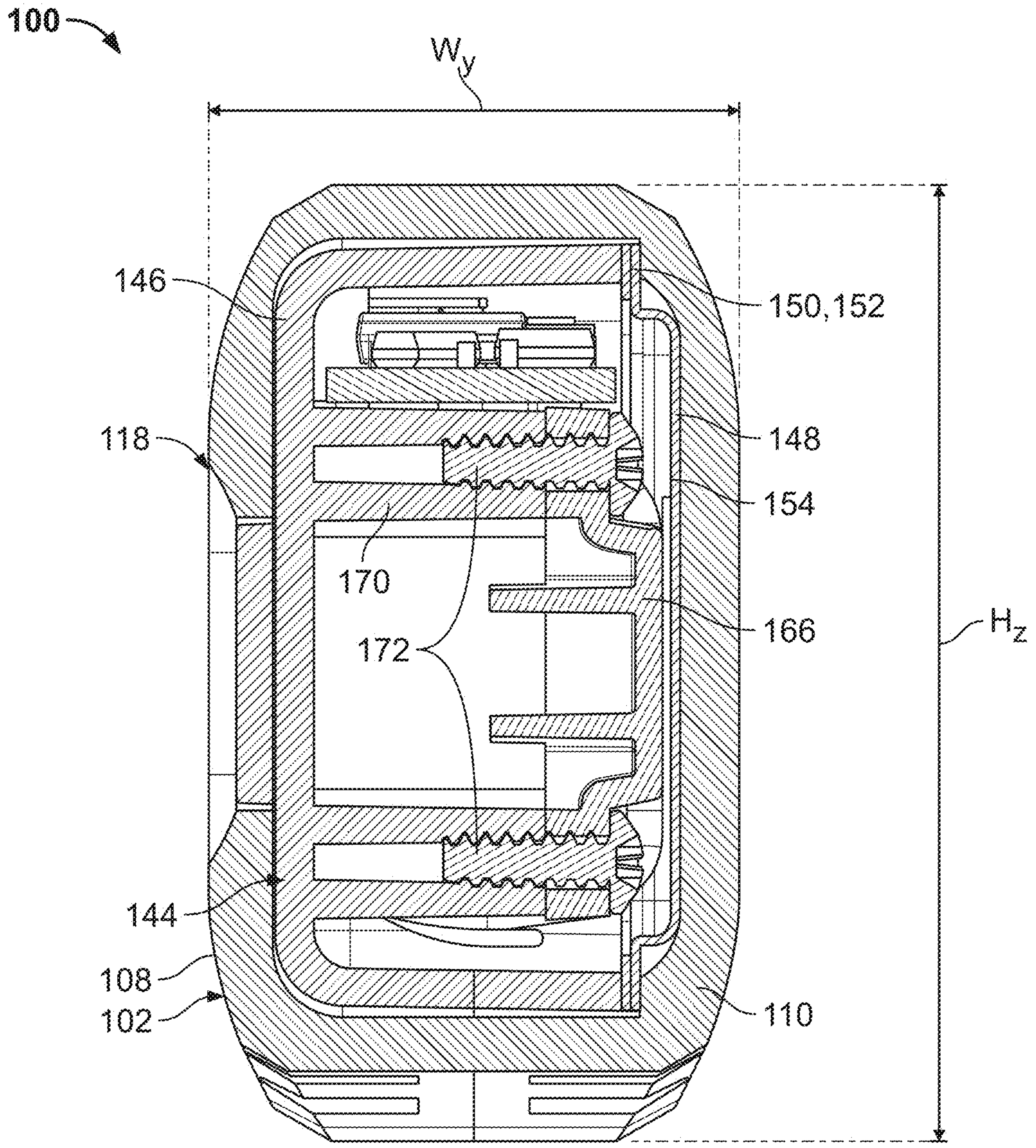
FIG. 8 is a cross-sectional rear side view of the light assembly, taken along line 8-8 of FIG. 1.

Referring now to FIG. 8, the flashlight assembly 100 defines a width $W_y$ as measured in the y-axis direction. As shown, the width is defined by the body assembly 102 and does not include the clip body 122 (not shown in FIG. 8). In some embodiments, a ratio between the height $H_z$ and the width $W_y$ of the flashlight assembly 100 is 1.8. That is, the ratio of $H_z$:$W_y$ is 1.8:1. In other embodiments, the ratio between the height $H_z$ and the width $W_y$ of the flashlight assembly 100 is between 1.4 and 2.2. In other embodiments, the ratio between the height $H_z$ and the width $W_y$ of the flashlight assembly 100 is between 1.6 and 2.

Figure 9:
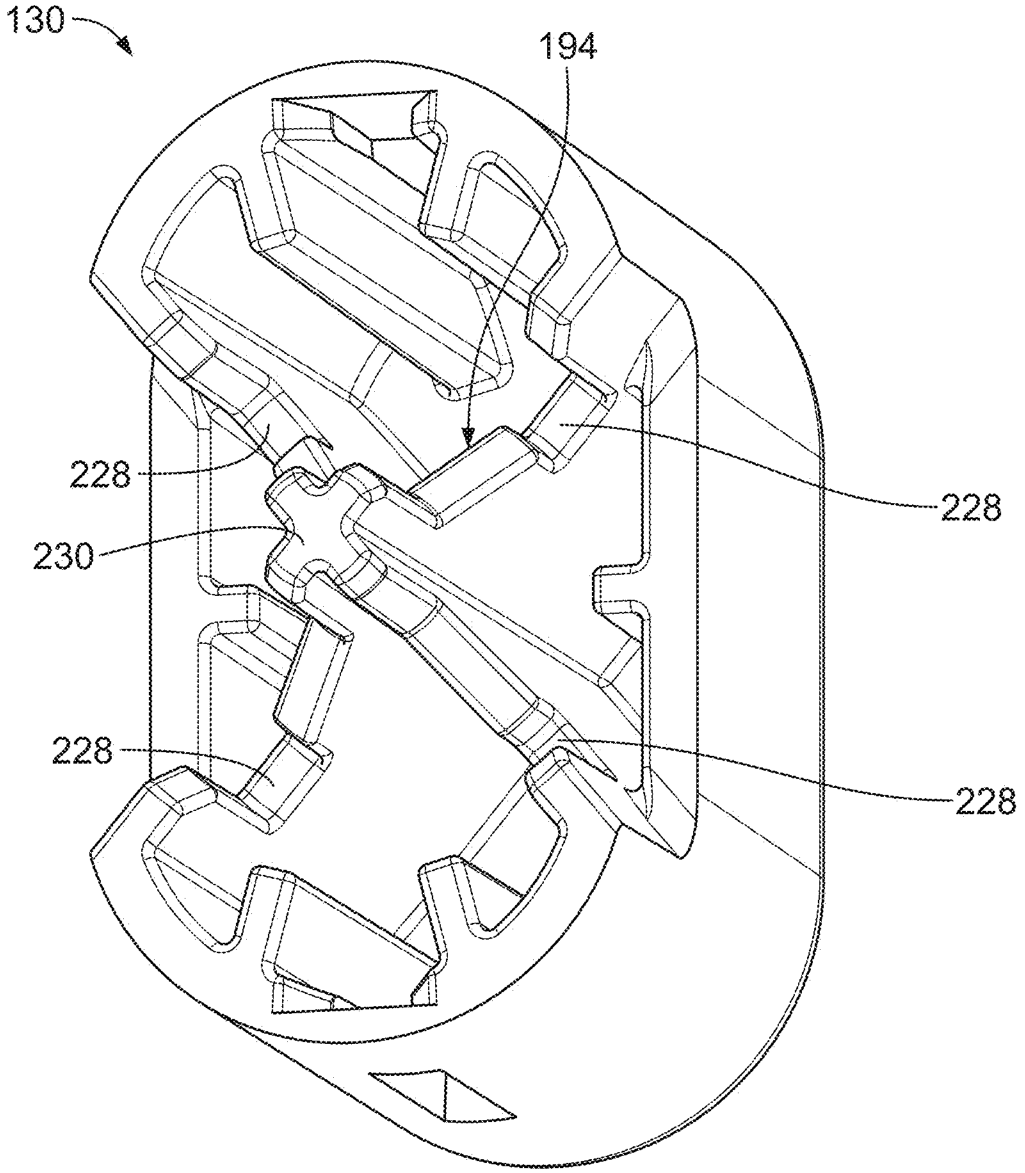
FIG. 9 is an isometric view of a switch button of the flashlight assembly of FIG. 1.

FIG. 9 illustrates an isometric view of the switch button 130 and the internal body 194 thereof. The internal body 194 includes four ribs that meet at a centrally-located actuator 230 that protrudes beyond the open end of the switch button 130. The four angled ribs provide a rigid internal structure for the switch button 130 and the actuator 230 provides an engagement point for the switch button 130 to engage the sealing boot 192 (which then engages the switch member 198 of the USB assembly 168) when the switch button 130 is actuated (i.e., sufficiently depressed). The four angles ribs of the internal body 194 are each interrupted by seating surfaces 228 in which the end of the wave spring 190 is seated.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

The invention claimed is:

1. A lighting device comprising:

a body having a front end and a rear end, the rear end opposing the front end;

a light source; and a switch assembly that extends through the rear end of the body, the switch assembly comprising a switch button, a sealing boot, and a wave spring, the switch button having an actuator, the wave spring being compressed between the switch button and the sealing boot such that the sealing boot covers an end opening of a subframe, the actuator extending through the wave spring, the switch assembly being depressible such that the actuator engages the sealing boot and applies pressure to a switch member disposed within the subframe, wherein, when the switch member is actuated, a signal is sent to the light source.

2. The lighting device of claim 1, wherein the wave spring is arranged and compressed between an internal body of the switch button and a flange of the sealing boot.

3. The lighting device of claim 2, wherein the internal body of the switch button includes a plurality of ribs, the ribs intersecting to form the actuator.

4. The lighting device of claim 1, wherein the body includes a first body member and a second body member that each extend from the front end to the rear end of the body, and wherein the light source extends through the front end of the body.

5. The lighting device of claim 1 further comprising:

an electronics subassembly including a power source and the switch member;

the subframe having an internal volume and a sealing surface that surrounds an opening in the subframe, the power source and the switch member being located within the internal volume, wherein the light source, the power source, and the switch member are electrically coupled together; and a seal having a perimeter, the perimeter being attached to the sealing surface.

6. The lighting device of claim 5, wherein the electronics subassembly further comprises a main printed circuit board and a USB assembly, the main printed circuit board and the USB assembly being electrically coupled to each other and to each of the light source and the power source.

7. The lighting device of claim 6, wherein the switch member is located on the USB assembly.

8. The lighting device of claim 6, wherein a surface of the main printed circuit board is perpendicular to a surface of the seal, and wherein a surface of a printed circuit board of the USB assembly is perpendicular to both the surface of the main printed circuit board and the surface of the seal.

9. The lighting device of claim 6, wherein the USB assembly includes a charging port, the body includes an opening, and the subframe includes a subport that permits access to the internal volume thereof, wherein, when the lighting device is assembled, the charging port, the opening, and the subport are aligned.

10. The lighting device of claim 9, wherein the charging port is accessible from an exterior of the body via the opening and in electrical communication with a battery that is located within the body.

11. The lighting device of claim 1, wherein the light source is part of a light assembly, the light assembly further comprising a lens, the lens including at least one positioner that extends radially from the lens and is dimensioned to engage at least one recess in the front end of the body to rotationally align the light assembly with the body.

12. The lighting device of claim 11, the light assembly further comprising a heatsink, wherein the at least one positioner defines a step in an axial direction that is dimensioned to engage the heatsink to axially align the lens with the heatsink.

13. The lighting device of claim 12, the light assembly further comprising a light printed circuit board and one or more positioning pins, the one or more positioning pins extending in an axial direction and through the light printed circuit board to rotationally align the light printed circuit board within the heatsink.

14. The lighting device of claim 1, wherein the body defines a length between the front end and the rear end thereof, a width, and a height, the length being greater than the height and the width and the height being greater than the width;

wherein a ratio of the length to the height is between 3.5 and 4.1.

15. A lighting device comprising:

a body having a front end and a rear end, the rear end opposing the front end;

a light source;

a power source, the power source being electrically coupled to the light source;

a subframe having an end opening located near the rear end of the body, wherein the body encloses the subframe;

a switch assembly that is electrically coupled to the light source and the power source, the switch assembly being engageable by a user from an exterior of the lighting device located near the rear end of the body, the switch assembly comprising a switch button, a sealing boot, and a wave spring, the switch button having an actuator, the wave spring being compressed between the switch button and the sealing boot such that the sealing boot covers the end opening of the subframe, the actuator extending through the wave spring.

16. The lighting device of claim 15 further comprising a switch member located inside an internal volume of the subframe, the switch assembly being depressible such that the actuator engages the sealing boot and applies pressure to the switch member, wherein, when the switch member is actuated, the light source is changed between a first state of operation and a second state of operation.

17. The lighting device of claim 15, wherein the body includes a first body member and a second body member that each extend from the front end to the rear end of the body, and wherein the first body member and the second body member are secured together via fasteners.

18. The lighting device of claim 15, wherein the subframe includes first and second retainers adjacent to the rear end of the body, and wherein the first and second retainers engage the switch button to secure the switch assembly to the subframe.

19. The lighting device of claim 15, wherein the body defines a length between the front end and the rear end thereof, a width, and a height, the length being greater than the height and the width and the height being greater than the width;

wherein a ratio of the height to the width is between 1.4 and 2.2.

20. A lighting device comprising:

a body having a front end and a rear end, the rear end opposing the front end, wherein the body includes a first body member and a second body member that each extend from the front end to the rear end of the body, and wherein the first body member and the second body member are secured together via fasteners;

a light source that extends through the front end of the body;

a power source;

a subframe having an end opening located near the rear end of the body, wherein the body encloses the subframe; and a switch assembly that extends through the rear end of the body, the switch assembly comprising a switch button, a sealing boot, and a wave spring, the switch button having an actuator, the wave spring being compressed between the switch button and the sealing boot such that the sealing boot covers the end opening of the subframe, the actuator extending through the wave spring.

* * * * *